(12) United States Patent
Chagnot

(10) Patent No.: US 11,255,540 B2
(45) Date of Patent: Feb. 22, 2022

(54) CRUDE AND WASTE OIL BURNER

(71) Applicant: Catherine J. Chagnot, Athens, OH (US)

(72) Inventor: Catherine J. Chagnot, Athens, OH (US)

(*) Notice: Subject to any disclaimer, the term of this patent is extended or adjusted under 35 U.S.C. 154(b) by 82 days.

(21) Appl. No.: 16/874,090

(22) Filed: May 14, 2020

(65) Prior Publication Data

US 2020/0400310 A1 Dec. 24, 2020

Related U.S. Application Data

(60) Provisional application No. 62/864,015, filed on Jun. 20, 2019.

(51) Int. Cl.
| | |
|---|---|
| *F23G 7/05* | (2006.01) |
| *F23G 5/32* | (2006.01) |
| *F23D 11/40* | (2006.01) |
| *F23L 15/04* | (2006.01) |
| *F23L 5/02* | (2006.01) |
| *F23Q 13/02* | (2006.01) |
| *F23D 11/10* | (2006.01) |

(52) U.S. Cl.
CPC ............. *F23G 7/05* (2013.01); *F23D 11/101* (2013.01); *F23D 11/408* (2013.01); *F23G 5/32* (2013.01); *F23L 5/02* (2013.01); *F23L 15/04* (2013.01); *F23Q 13/02* (2013.01); *F23D 2202/00* (2013.01); *F23G 2206/20* (2013.01); *F23G 2207/10* (2013.01); *F23G 2209/102* (2013.01)

(58) Field of Classification Search
CPC .... F23G 7/05; F23G 2209/102; F23D 11/101; F23D 11/408; F23D 2202/00; F23L 15/04
See application file for complete search history.

(56) References Cited

U.S. PATENT DOCUMENTS

| | | | | |
|---|---|---|---|---|
| 3,840,183 | A * | 10/1974 | Kuribayashi | ......... B01F 5/0473 239/305 |
| 4,018,216 | A | 4/1977 | Thurley | |
| 4,759,312 | A | 7/1988 | Pletzer | |
| 5,299,512 | A | 4/1994 | Olsen | |
| 2009/0000530 | A1 * | 1/2009 | Fujita | ........................ F23G 5/12 110/191 |
| 2009/0291401 | A1 | 11/2009 | Nakagawa et al. | |
| 2016/0033127 | A1 * | 2/2016 | VanNatta | ................ F23N 3/002 110/244 |
| 2017/0045223 | A1 | 2/2017 | Fisk | |
| 2018/0283789 | A1 * | 10/2018 | Kobayashi | .............. C03B 3/023 |
| 2019/0003706 | A1 * | 1/2019 | Kang | ..................... F23D 91/02 |

* cited by examiner

*Primary Examiner* — David J Laux
(74) *Attorney, Agent, or Firm* — Frank H. Foster; Kremblas & Foster

(57) ABSTRACT

A burner capable of burning crude or other heavy oil. A combustion chamber is surrounded by a wall of thermal insulation. An air-fuel injector pipe extends through the wall and opens into the combustion chamber. An oil supply pipe extends along the interior of the air fuel injector pipe to an inner open end that is proximate the inner end of the air-fuel injector pipe. A venturi insert is fixed within the air-fuel injector pipe and has an orifice positioned outward of the open inner end of the oil supply pipe. A combustion air supply including a blower and a recuperator transfers heat from outgoing combusted exhaust gases to incoming combustion-supporting air being blown through the recuperator and the air fuel injector pipe into the combustion chamber.

18 Claims, 14 Drawing Sheets

CRUDE AND WASTE OIL BURNER

CROSS REFERENCE TO RELATED APPLICATION

This non-provisional patent application claims the benefit of provisional patent application filed Jun. 20, 2019 and given application No. 62/864,015. That provisional application is hereby incorporated by reference.

BACKGROUND OF THE INVENTION

This invention is a burner for generating heat at high temperatures using various types of crude oil and heavy, used waste oil as its fuel. A range of oils can be used including various biodiesel fuels such as B99 and waste cooking oil. The preferred embodiment of the burner is specially designed to power a Stirling engine but can also provide heat for other applications such as, for example, other external combustion engines, heating a living space or heating water for a domestic or other water supply.

The prior art shows many oil burners of various types. Crude oil and heavy used waste oils are particularly difficult to burn because of their low volatility and high viscosity. Their high viscosity makes them difficult to atomize. Their low volatility makes them difficult to ignite. Their characteristics also make it difficult to burn them in a manner that their combustion provides a high temperature, such as a temperature that meets or exceeds 1150° C. for powering a Stirling engine at a head temperature on the order of 500° C.

Another problem often encountered with burners that burn such heavy oils is that they commonly require periodic cleaning or repair at relatively short intervals making their continuous operation impractical or at least costly. It is particularly difficult to burn such oils at temperatures that are necessary to make operation of a Stirling engine practical and efficient. Stirling engines require burner temperatures on the order of 1100° C. to 1400° C. Experimentally, it was not possible to get conventional oil burners to work for driving a Stirling engine. The nozzles used in conventional oil burners formed char deposits near the outlet of the nozzle orifice which would cause the nozzle to clog when the burner was shut down. Conventional heavy oil burners commonly require that the oil be supplied to the nozzle at a high pressure from 30 psi or more and typically 100 psi. That requires a pump that can supply the oil at the required pressure. Such pumps require numerous parts, the nozzles often require oil heaters and they operate at a high pressure which together reduce reliability and lead to more frequent servicing than pumps operating at low pressure.

Yet another problem with conventional heavy oil burners is igniting the fuel. Conventional oil burners commonly use electric spark or arc ignitors. They work well for lighter oils such as commonly used for home heating furnaces. But it was experimentally found that electric ignitors would not reliably ignite crude oil and heavy, used waste oil.

Therefore an object and feature of the invention is to provide a heavy oil burner that can achieve high temperatures, does not require a nozzle for atomizing and emitting the oil fuel into the burner, does not require a high pressure pump, can be reliably ignited and will operate continuously for months without servicing. The invention accomplishes this purpose by the use of a combination of structural features that cooperate to provide a heavy oil burner that operates reliably, provides the necessary high temperatures while doing so with an unusually long mean time between servicing

SUMMARY OF THE INVENTION

The invention is a burner capable of burning crude or other heavy oil and has a combustion chamber surrounded by a wall of thermal insulation. An air-fuel injector pipe extends through the wall and opens into the combustion chamber. An oil supply pipe extends along the interior of the air fuel injector pipe to an inner open end that is proximate the inner end of the air-fuel injector pipe. A venturi insert is fixed within the air-fuel injector pipe and has an orifice positioned outward of the open inner end of the oil supply pipe. A combustion air supply, including a blower and a recuperator, transfers heat from outgoing combusted exhaust gases to incoming combustion-supporting air being blown through the recuperator and the air fuel injector pipe into the combustion chamber.

Figure 1:
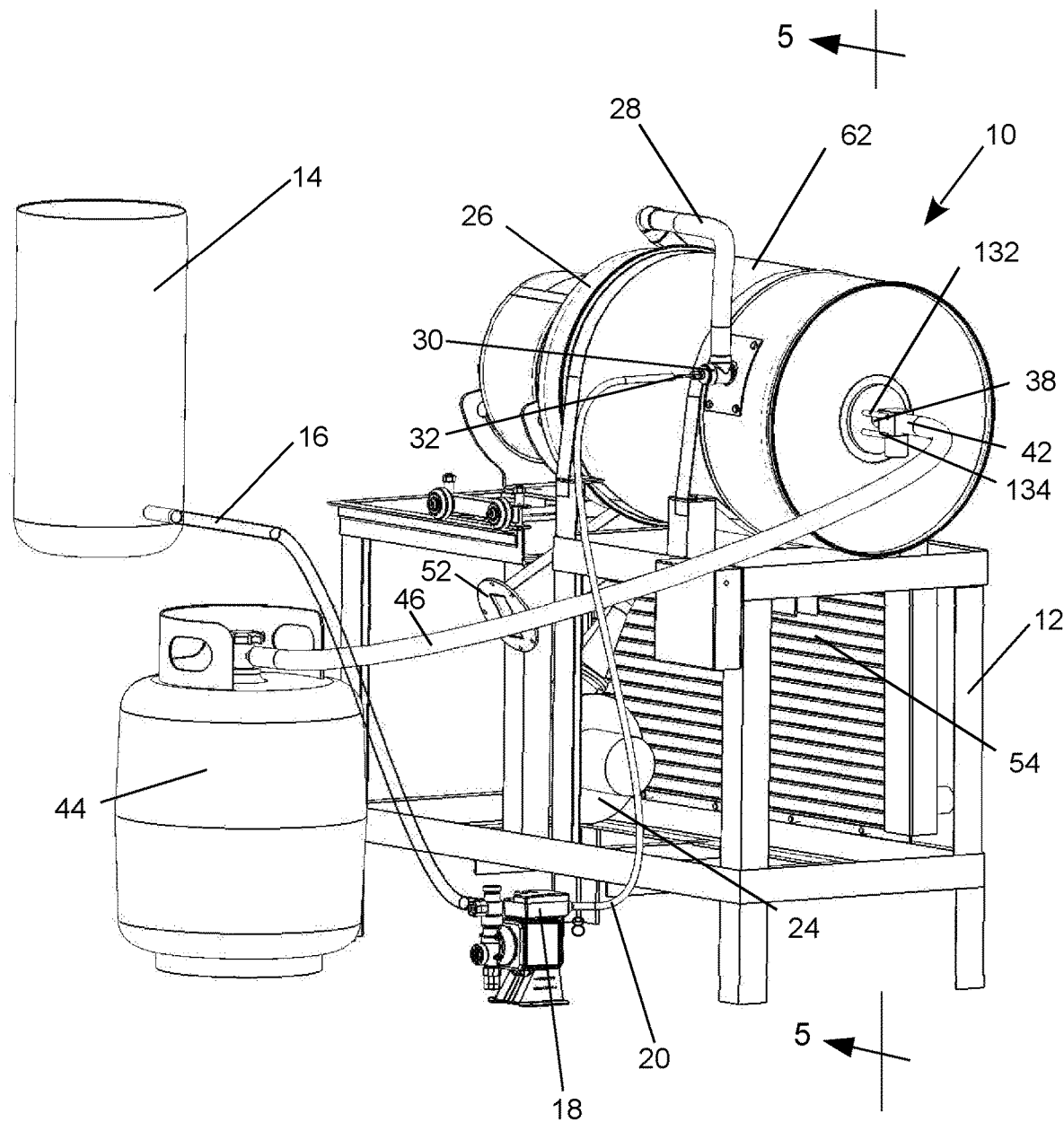
FIG. 1 is a view in perspective of the preferred embodiment of the invention.
Figure 2:
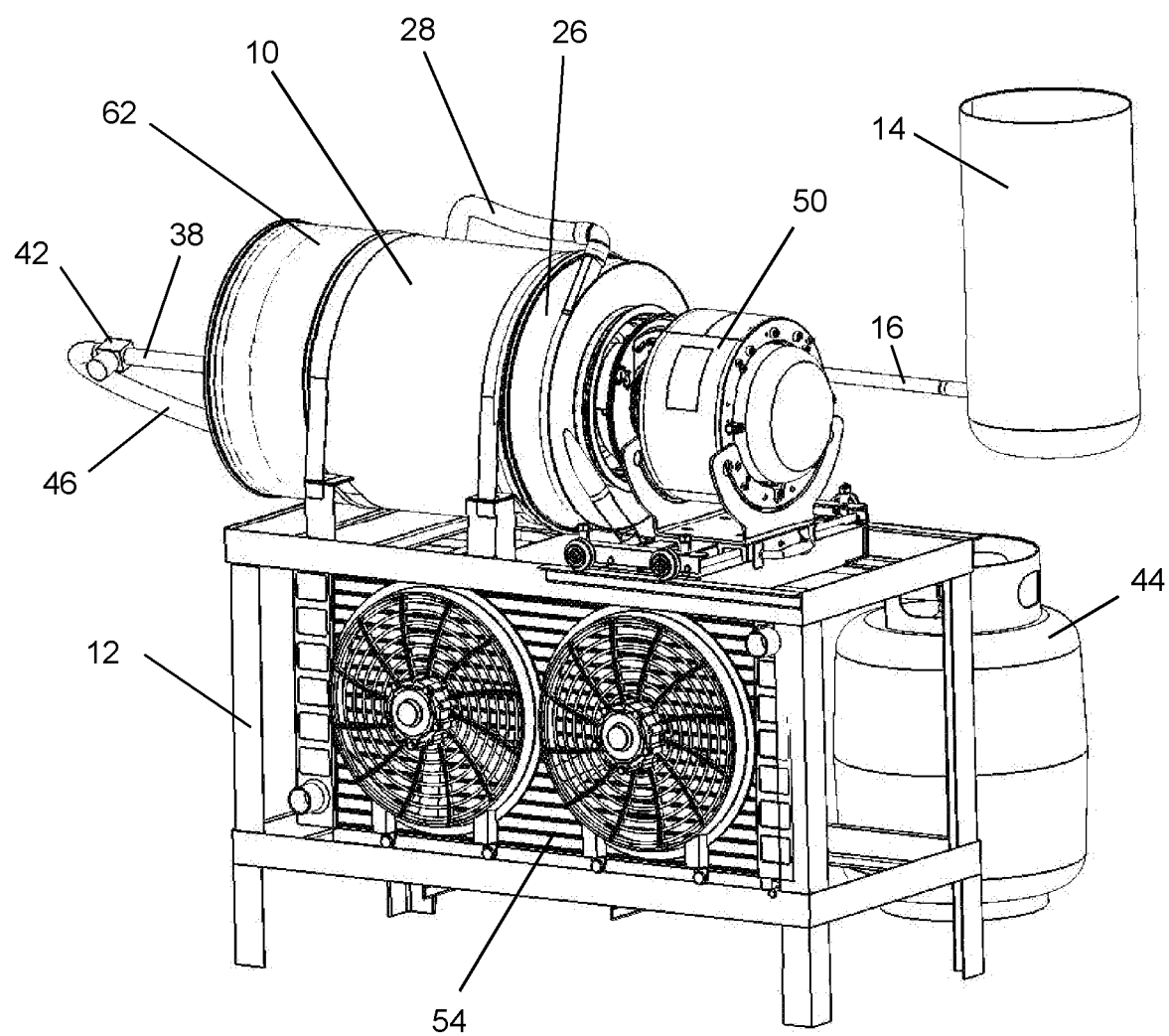
FIG. 2 is another view in perspective of the preferred embodiment but viewed from the opposite side from FIG. 1.
Figure 3:
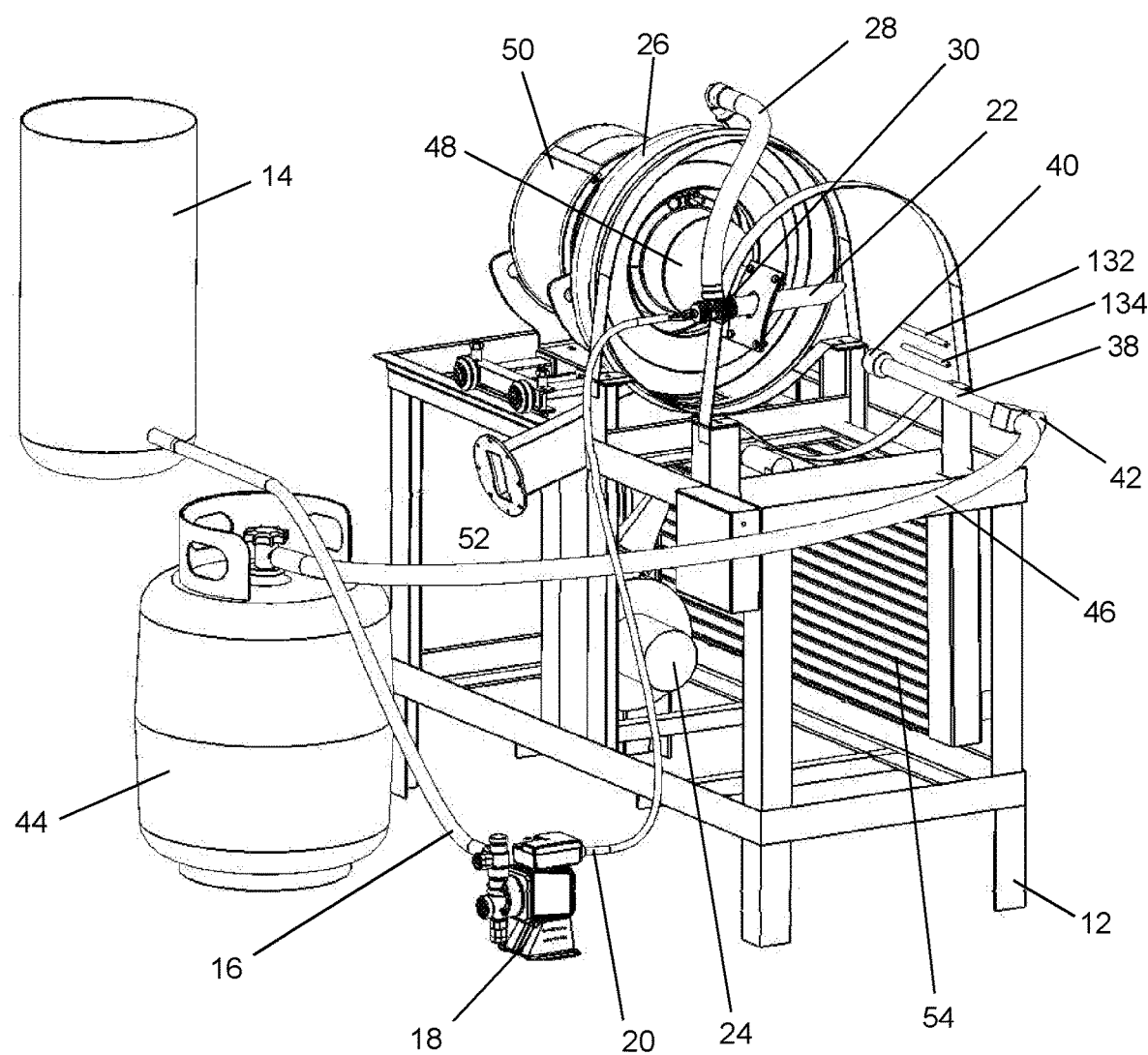
FIG. 3 is a view in perspective of the preferred embodiment viewed similarly to FIG. 1 but showing some components removed to reveal interior components.
Figure 4:
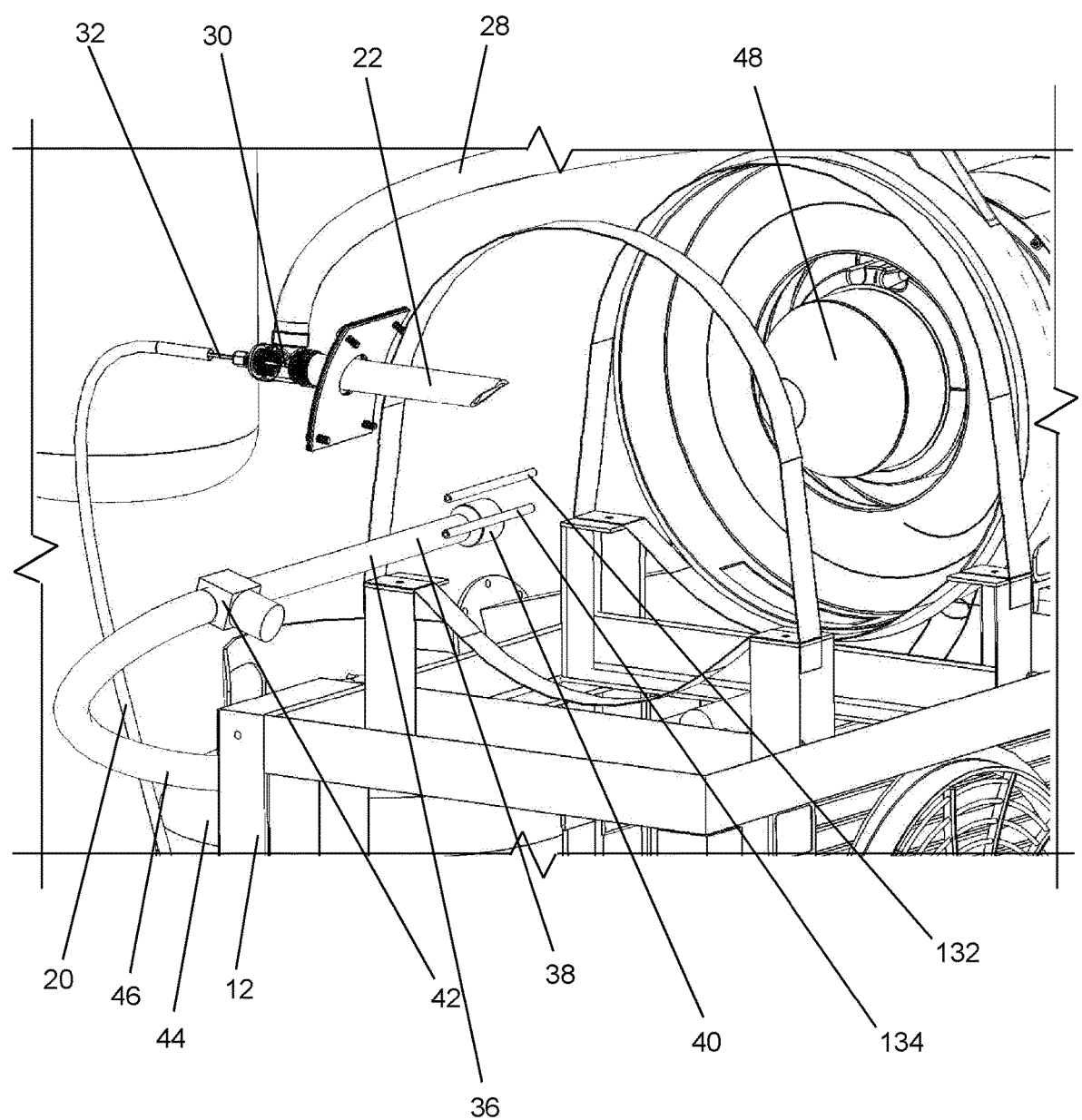
FIG. 4 is a view in perspective of the preferred embodiment viewed from a different angle and more close up and detailed with some components removed to reveal interior components.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE INVENTION

The preferred embodiment of the invention has five principal components, each with multiple subcomponents, and it is the structure of these components and the cooperative relationships between them that accomplish the objects of the invention. The principal components are:

(1) a vortex burner;
(2) an air and fuel supply including an air-fuel injector pipe, an oil supply pipe, a venturi and their relationship to the burner combustion chamber;
(3) a recuperator for preheating incoming combustion-supporting air;
(4) a gas flame ignitor and its relationship to the air-fuel injection and mixing structures and to the burner combustion chamber; and
(5) a Stirling engine and its relationship to the burner.

The accompanying drawings and the following description describe the preferred embodiment of the invention. However, the invention can be implemented with alternative structures that vary from the structural features of the preferred embodiment. In order to better illustrate the structural features of the preferred embodiment, several figures of the drawings have parts removed to reveal internal parts that would be wholly or partly concealed by the removed parts. Although reference numbers are used to refer to component parts, not all reference numbers are included in all figures.

Overview of Components of Preferred Embodiment

The relationship between the principal components of the preferred embodiment will first be described and then the sub-component parts of the principal components will be described in greater detail. The arrangement of the principal components is best illustrated in FIGS. 1 through 4. In the drawings several of the figures have component parts removed to reveal components that otherwise would be concealed behind the removed components.

A vortex burner 10 is supported on a stand 12. The oil used as fuel is contained in a fuel tank 14. The fuel tank 14 is not sealed from the atmosphere so the contained oil is at atmospheric pressure. Fuel from the tank 14 is conveyed through a transparent tank hose 16 to a pump 18. The oil is pumped through a pump hose 20 to an air-fuel injector pipe 22 from which an air-fuel mixture is injected into the burner 10.

Air for supporting combustion is blown in from the ambient atmosphere and through a recuperator 26 by a blower 24. The recuperator 26 is a counter flow heat exchanger that transfers heat from hot combusted gases to incoming combustion-supporting air as the combusted gases exit from the burner, flow through the recuperator 26 and are then exhausted to the ambient atmosphere. The combusted gases and the incoming air flow through separate chambers in the heat exchanger so those gases do not mix. During steady-state operation following burner ignition and warm-up, combustion-supporting air, typically at a temperature in the range of 130° C. and 200° C., is blown out of the recuperator 26 through an air conduit 28 that is connected to a pipe fitting which is a Tee 30. The Tee 30 is connected to the end of the air-fuel injector pipe 22. A small oil supply pipe 32 is sealingly connected through the outermost end of the Tee 30 and extends into and along the interior of the air-fuel injector pipe 22. Pre-heated, combustion-supporting air from the air conduit 28 is forced into and along the air-fuel injector pipe 22 into the combustion chamber of the burner 10, as will be described in more detail.

Figure 5:
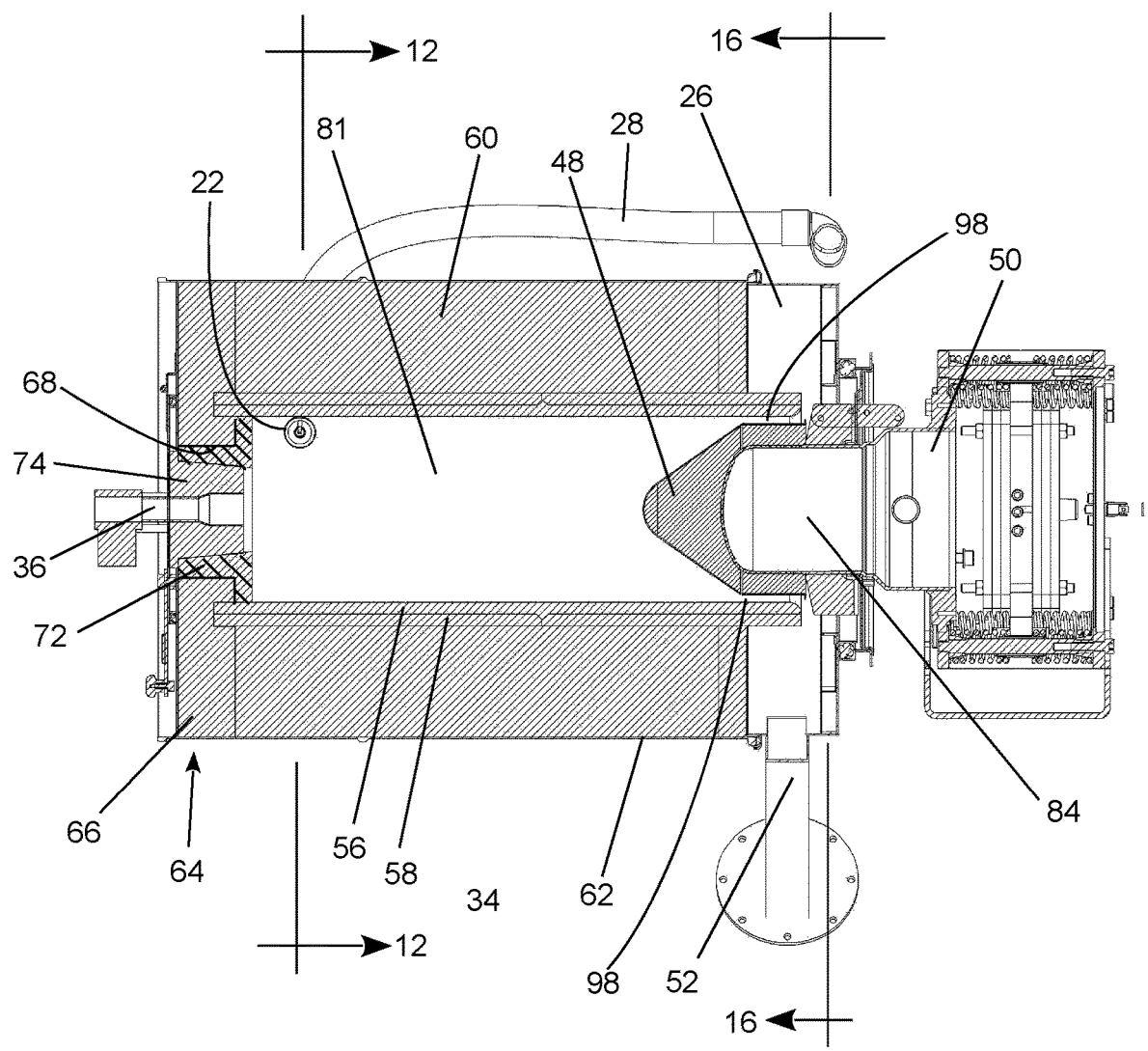
FIG. 5 is a view in vertical, axial section through the combustion chamber and taken along the line 5-5 of FIG. 1.
Figure 6:
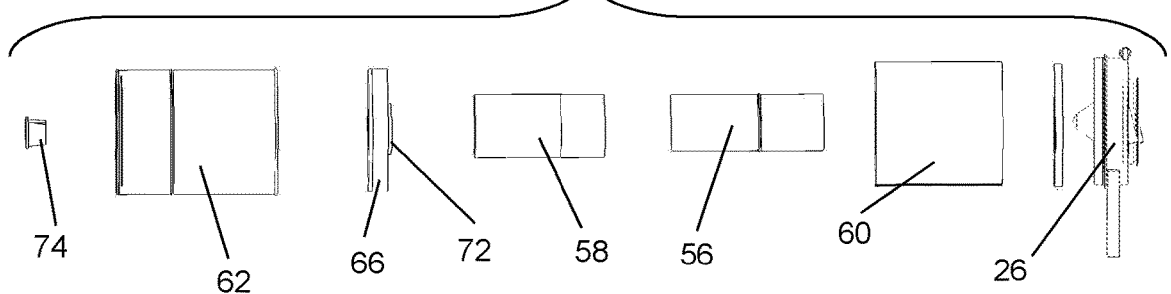
FIG. 6 is an exploded view of ceramic and insulating components that surround the combustion chamber and that close its end that is opposite the Stirling engine.
Figure 7:
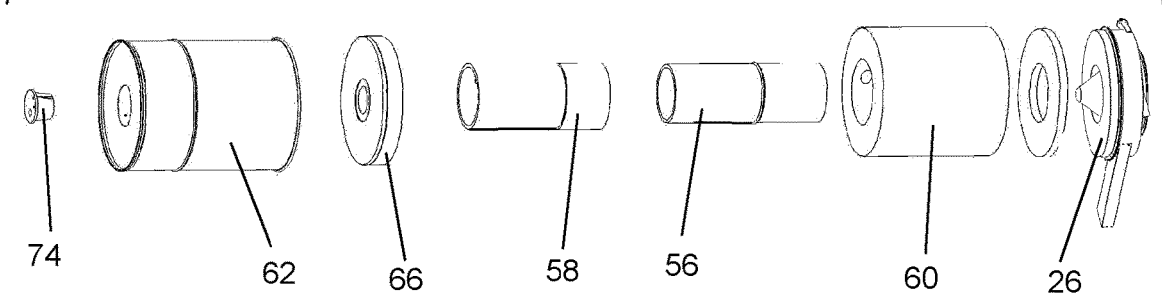
FIG. 7 is an exploded view like FIG. 6 but in perspective viewed to reveal an end of the ceramic and insulating components that surround the combustion chamber and that close its end that is opposite the Stirling engine.
Figure 8:
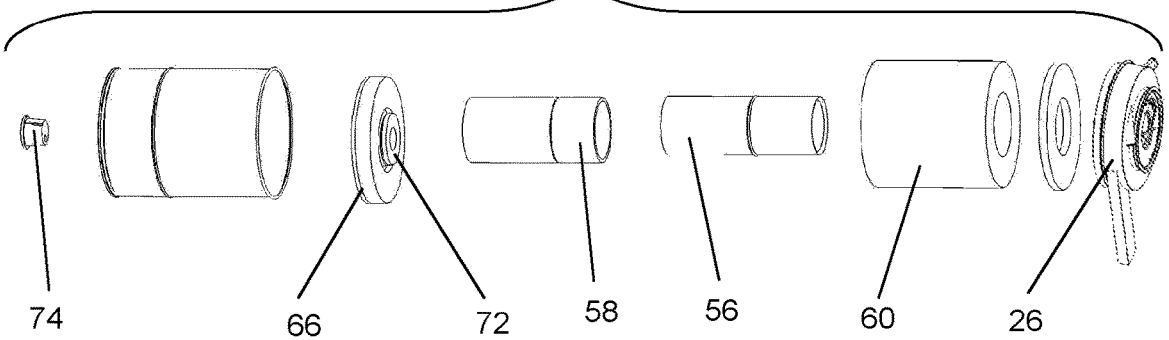
FIG. 8 is an exploded view like FIG. 6 but in perspective viewed to reveal the end that is opposite the end that is visible in FIG. 7 showing the ceramic and insulating components that surround the combustion chamber and that close its end that is opposite the Stirling engine.

A propane torch 36 is provided for the purpose of igniting the mixture of the oil fuel and the combustion air when they are initially injected into the combustion chamber 81 during a start-up procedure. The combustion chamber 81 is best seen in FIG. 5 and is a cylindrical space or volume that is the interior of a cylindrical burner core 34. Although the ignitor torch 36 was described as a "propane" torch, other flammable gases, such a butane or natural gas, may also be used as the ignitor fuel supply. The ignitor torch 36 has a ceramic torch pipe 38 with a ceramic flame holder 40 at its interior end and an electronic ignition and solenoid valve 42 at its exterior end for turning the gas supply to the torch 36 on and off and for igniting its flame under the control of a control system. The gas fuel for the ignitor torch 36 is supplied from an ignitor fuel tank 44 through an ignitor fuel hose 46 to the solenoid valve 42.

The preferred embodiment of the invention is particularly advantageous for powering a Stirling engine. Stirling engines are especially desirable when they drive an alternator or electrical generator for supplying electrical power although they are also useful for driving other loads such as a water pump or a refrigeration system. The structure of the Stirling engine 50 that is used with the preferred embodiment does not itself form a part of the invention. The burner of the invention heats a solid metal, heat-distributing head 48 that surrounds an internal head 84 at the hot, heat accepting end of the Stirling engine 50. The preferred heat-distributing head 48 is clad with a stainless steel shell that is filled with copper. The heat-distributing head 48 accepts heat from the combustion chamber 81, protects the underlying metallic internal head 84 of the Stirling engine 50 and conducts heat from the combustion chamber 81 to the Stirling engine internal head 84. The internal head 84 is part of the hermetically sealed casing for the Stirling engine that is known to those skilled in the Stirling engine art. The heat-distributing head 48 extends into the burner core 56 and is swept by hot combustion gases as the combusting gases swirl in the helical manner of a vortex within the combustion chamber 81 and migrate longitudinally along the combustion chamber 81 from the interior end of the air-fuel injector pipe 22 toward and past the heat-distributing head 48. As will be seen, the hot combustion gases flow against and around the heat-distributing head 48 and then pass out of the combustion chamber and into and through the recuperator 26. Although a significant quantity of heat is transferred by forced convection from the combusting gases that sweep the heat-distributing head 48, heat is principally transferred to the heat-distributing head 48 by radiation including radiation from the inner wall of the burner core 34. Therefore, the heat-distributing head 48 extends into the combustion chamber 81 nearly its entire length and is located concentrically within the burner core 34. From the recuperator 26 the combustion gases flow out through an exhaust pipe 52 to the ambient atmosphere. A radiator 54 is connected to a cooling system of the Stirling engine for transferring heat that is rejected from the Stirling engine to the ambient atmosphere.

Vortex Ceramic Burner

The combustion chamber 81 of the burner is surrounded by three cylindrical, contiguous, ceramic insulation layers which are surrounded by a stainless steel cylindrical barrel 62. The insulation layers and the barrel 62 are preferably concentric. Referring particularly to FIGS. 5 through 11, the innermost ceramic layer of the burner is an inner core 56 that forms the inner wall of the combustion chamber 81. The cylindrical inner core 56 is a tube that desirably is formed by being cast against the inner wall of a riser liner 58. The riser liner 58 is a cylindrical ceramic tube that, in the illustrated preferred embodiment, comprises two commercially available riser liners that are commonly used in the steel casting industry to form a liner of a riser in a mold for casting metal parts. They are concentrically positioned around a common central axis and abut end to end. The preferred riser liners 58 have a cylindrical wall that is approximately 15-20 mm thick.

The burner's inner core 56 is a very light insulating ceramic that is cast from a particulate ceramic powder sold under the trademark RESCOR 740 or RESCOR 750 by Cotronics Corp of New Jersey. The RESCOR 740 is preferred because it has a lower density and a lower thermal conductivity making it a better insulator. However, other suitable, low thermal conductivity, insulating ceramic materials that are able to survive the burner temperatures that are referred to may be used. The ceramic material for forming the inner core 56 should have a thermal conductivity less than 10 BTU in/(h·ft$^2$·° F.) and more desirably less than 4 BTU in/(h·ft$^2$·° F.) and most preferably a thermal conductivity of 1 BTU in/(h·ft$^2$·° F.) or less. Although use of a ceramic that is castable provides a convenient method of manufacture, use of a castable ceramic is not necessary. The inner core should be a ceramic with a low thermal conductivity to provide high insulating characteristics and a low thermal mass to minimize the time required to heat the burner to its steady state operating temperature and be sufficiently durable that it will not significantly deteriorate at the burner temperatures.

In order to cast the inner core 56, an inner mold wall is formed within the riser liner 58 using a segment of PVC pipe. The assembled PVC pipe is supported concentrically within the riser liner 58 so that it is spaced approximately 10 to 12 mm from the inner wall of the riser liner 58. The Rescor powder is combined with its liquid activator and the ceramic mixture is poured between the PVC pipe and the riser liner 58. After the mixture hardens overnight, the inner mold wall is removed. As a result of this process the inner core 56 and the riser liner 58 are bonded together as a unitary body that has a total wall thickness that is approximately 25 to 32 mm thick. They are then placed in a kiln to cure the inner core 56. As a consequence of this process an inner core is provided that has a light enough thermal mass that it will heat up quickly enough to better enable combustion to be initiated and maintained. The inner core 56 operates at a temperature that is between 1000° C. and 1150° C.

A third and outer, concentric, cylindrical, ceramic insulation layer 60 is formed by wrapping a soft, 1 inch thick, alumina silica blanket insulation approximately four or five times around the riser liner 58. The alumina silica blanket insulation withstands temperatures in excess of 2000° C. The outer insulation layer 60 is wrapped enough times so that the outer diameter of the outer insulation layer 60 is about the same as the inner diameter of a stainless steel barrel 62 that forms a hard protective casing for the burner. The outer insulation layer 60 may be somewhat compressed so that the assembled three layers of insulation are supported in a stable, coaxially centered configuration.

Figure 9:
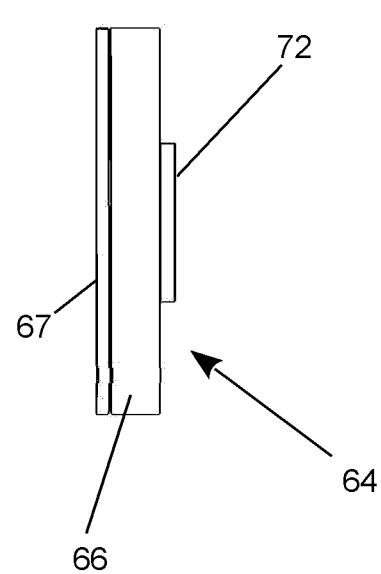
FIG. 9 is a side view of the endcap assembly of the invention.
Figure 10:
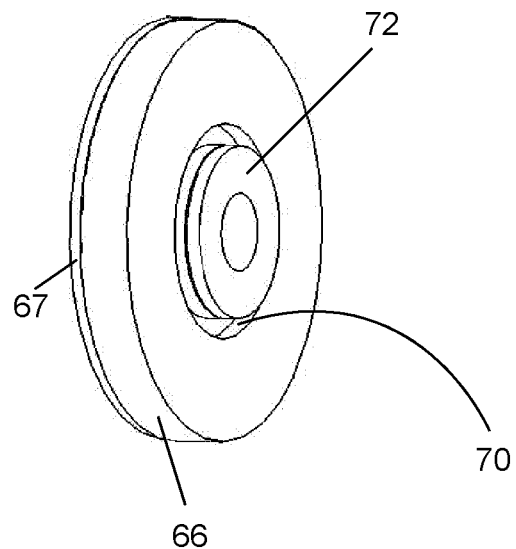
FIG. 10 is view in perspective of the endcap assemble shown in FIG. 9.
Figure 11:
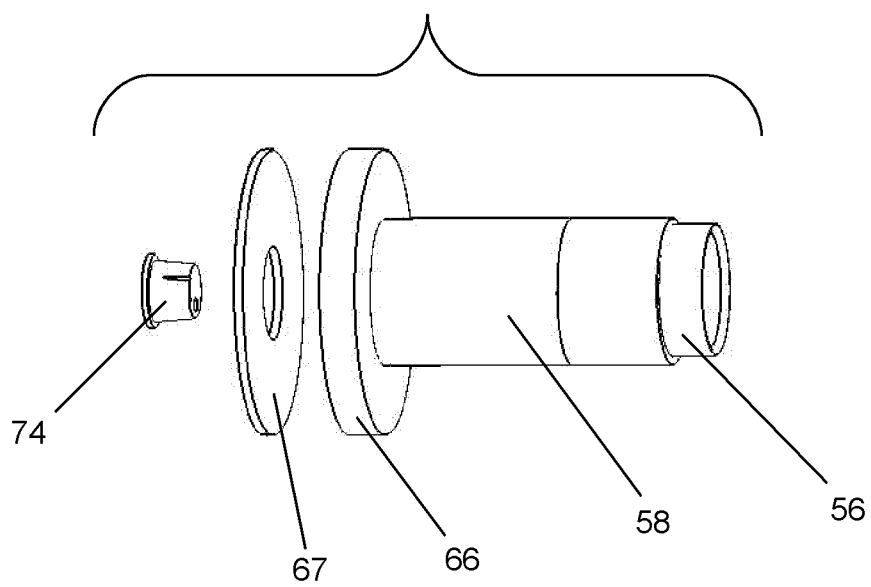
FIG. 11 is an exploded view of the endcap assembly with the riser liner seated in the circular groove of the endcap assembly.

Referring in particular to FIGS. 9 and 10, the end of the burner that is opposite the Stirling engine 50 is closed by an endcap assembly 64. The endcap assembly 64 has a ceramic endplate 66 formed from a soft alumina silica, high temperature insulation board called "foamboard" which is commercially available as a board stock. The endplate 66 has a circular periphery and a central hole 68. Using a lathe, a circular coaxial slot 70 is turned into a face of the endplate 66. The circular slot 70 is machined to a radial thickness, and its inner and outer cylindrical walls are positioned, so that the combined inner ceramic core 56 and riser liner 58 matingly fit into the circular slot 70.

Referring particularly to FIGS. 5 and 9-11, an end wall of the combustion chamber 81 is formed by casting a hat-shaped combustion chamber end wall member 72 out of the same, previously-described, Rescor insulating ceramic. The end wall member 72 is cast in situ (in place) within the central hole 68 of the endplate 66 by using a suitably shaped mold and processing it in the same manner as previously described to form a unitary body comprising the endplate 66 and the end wall member 72. The end wall member 72 is cast so that a circular flange portion protrudes axially from the inner surface of the endplate 66. The outer periphery of the circular flange portion of the end wall member 72 has a diameter so that it slides snugly into the cylindrical inner wall of the inner core 56. The ends of the inner core 56 and the riser liner 58 seat in the circular slot 70 against the bottom of the circular slot 70 in the end plate 66. In order to assure that the end of the unitary structure of the bonded inner core 56 and riser liner 58 fits snugly into the circular slot 70 of the endplate 66, the inner diameter and the outer diameter of the unitary structure should match the inner and outer diameters of the circular slot 70.

Preferably the central opening through the end wall member 72 is tapered in a frusto-conical manner so that an inspection plug 74 can be inserted into and easily removed from the central opening. The inspection plug 74 is described below in more detail with the description of the gas flame ignitor. A foamboard disk 67 (FIG. 11) can be provided that is coaxial with and outward from the endplate 66 to provide additional insulation. It has a central hole to permit access to the inspection plug 74.

Figure 17:
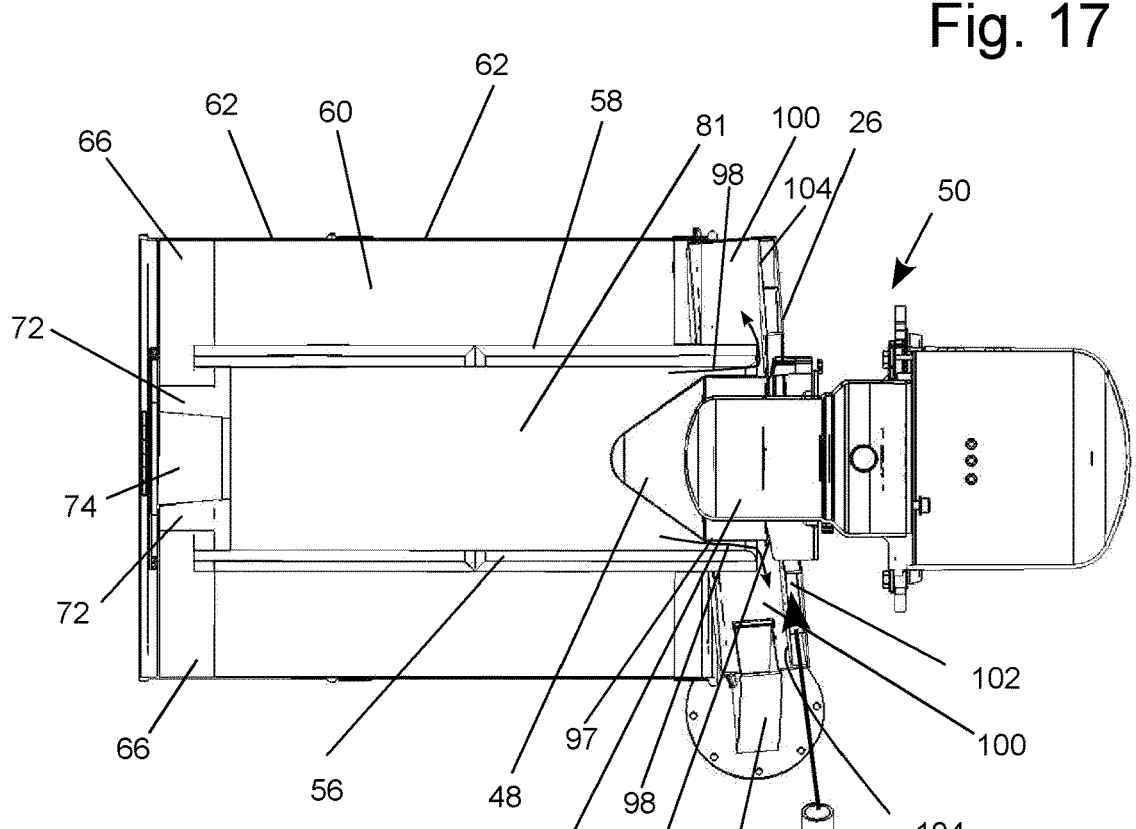
FIG. 17 is a view in vertical section through the central axis of the combustion chamber and illustrating the flow of hot combusted gases and of incoming combustion air through the recuperator taken along the line 5-5 of FIG. 1.
Figure 18:
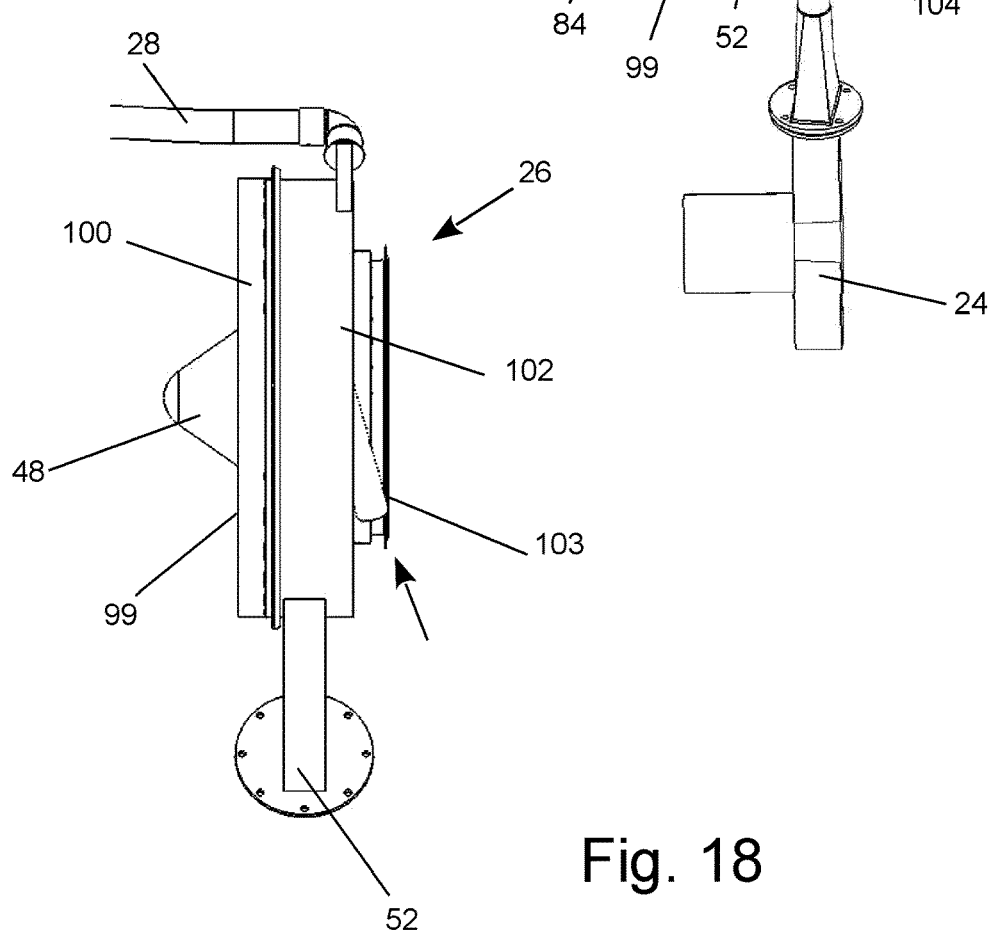
FIG. 18 is a side view of the recuperator of the of the preferred embodiment of the invention.

At the Stirling engine 50 end of the unitary structure, which is formed by the inner core 56 and riser liner 58 bonded together, an annular gap 98 (FIGS. 5 and 17) exists around the heat-distributing head 48 between the heat-distributing head 48 and the inner core 56. For example the annular gap may be 8-10 mm in an embodiment of the invention. The annular gap should be symmetrical in order to assure a symmetric outflow of hot combusted gases around the heat-distributing head 48 of the Stirling engine in order to maintain and even or uniformly distributed heat transfer as the gases flow out of the combustion chamber and 81 into the recuperator 26. To assist in the maintenance of a smooth symmetric flow, the engine end of the burner core 34 is formed with a symmetrical end that is rounded on its inner edge.

Air-Fuel Injection and Mixing

Figure 12:
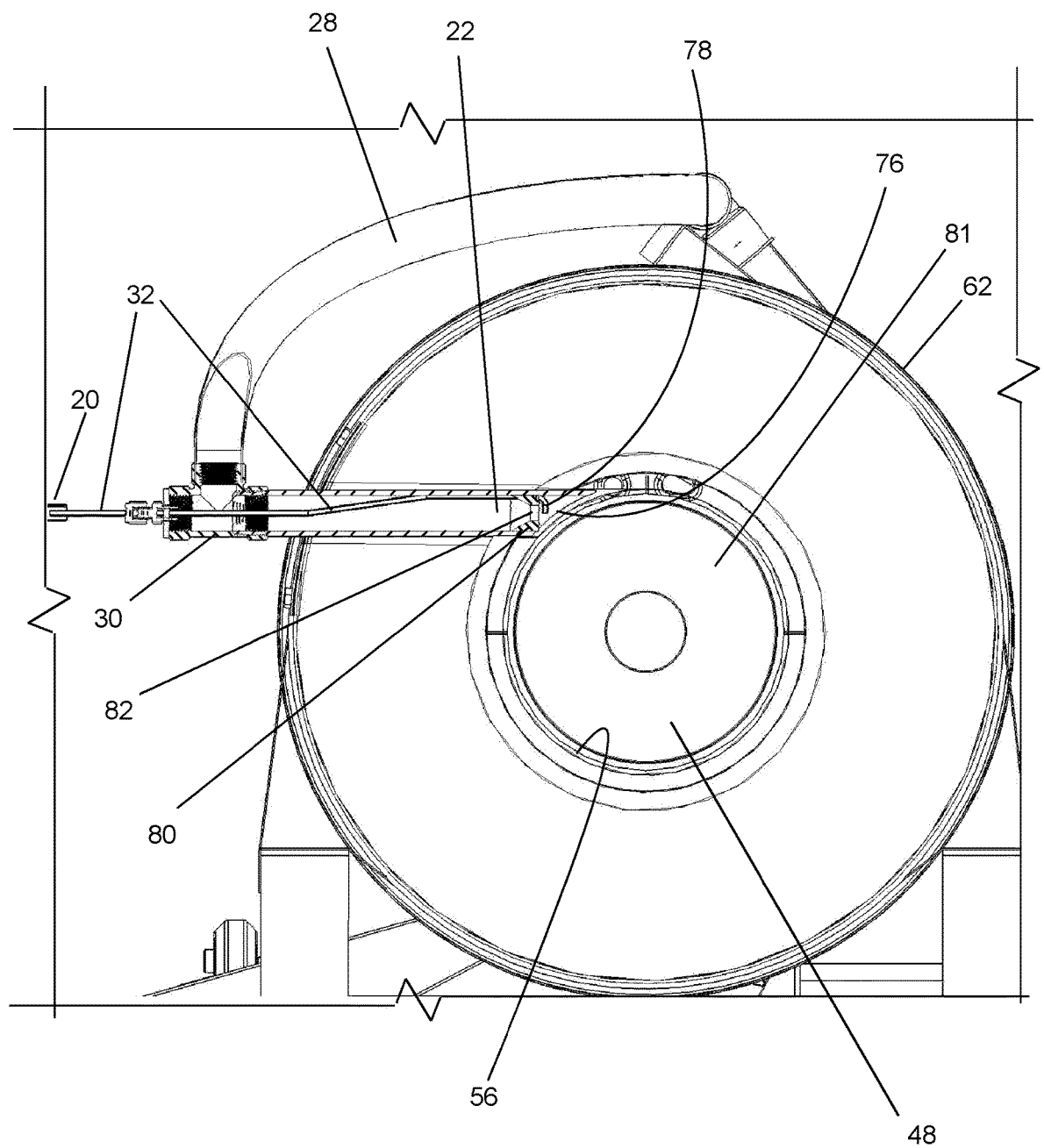
FIG. 12 is a view in lateral, vertical section taken perpendicular to the central axis of the combustion chamber and through the line 12-12 of FIG. 5 with some parts removed to reveal underlying parts.
Figure 13:
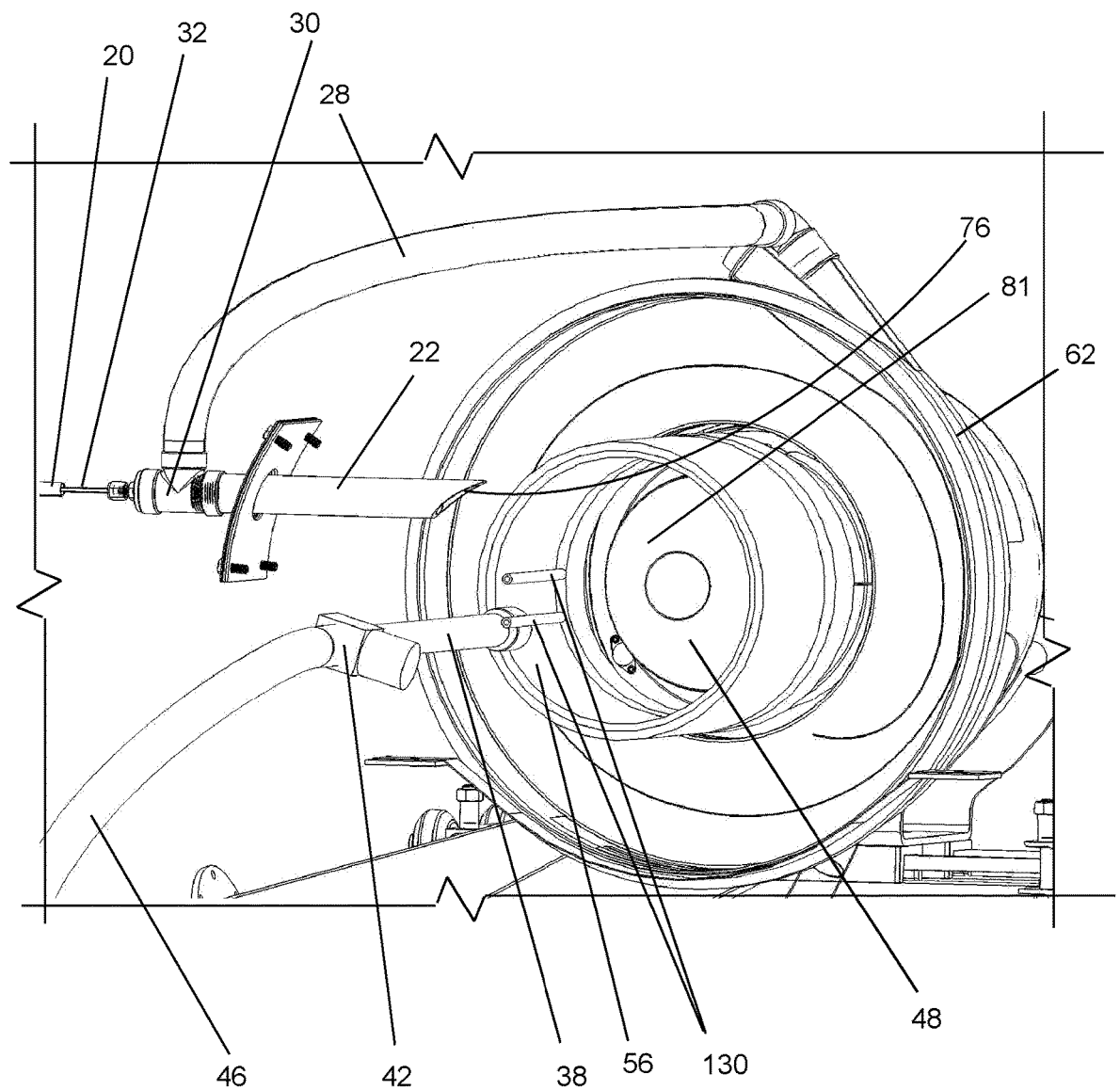
FIG. 13 is a view in perspective of the combustion chamber with some parts removed to reveal underlying parts.
Figure 14:
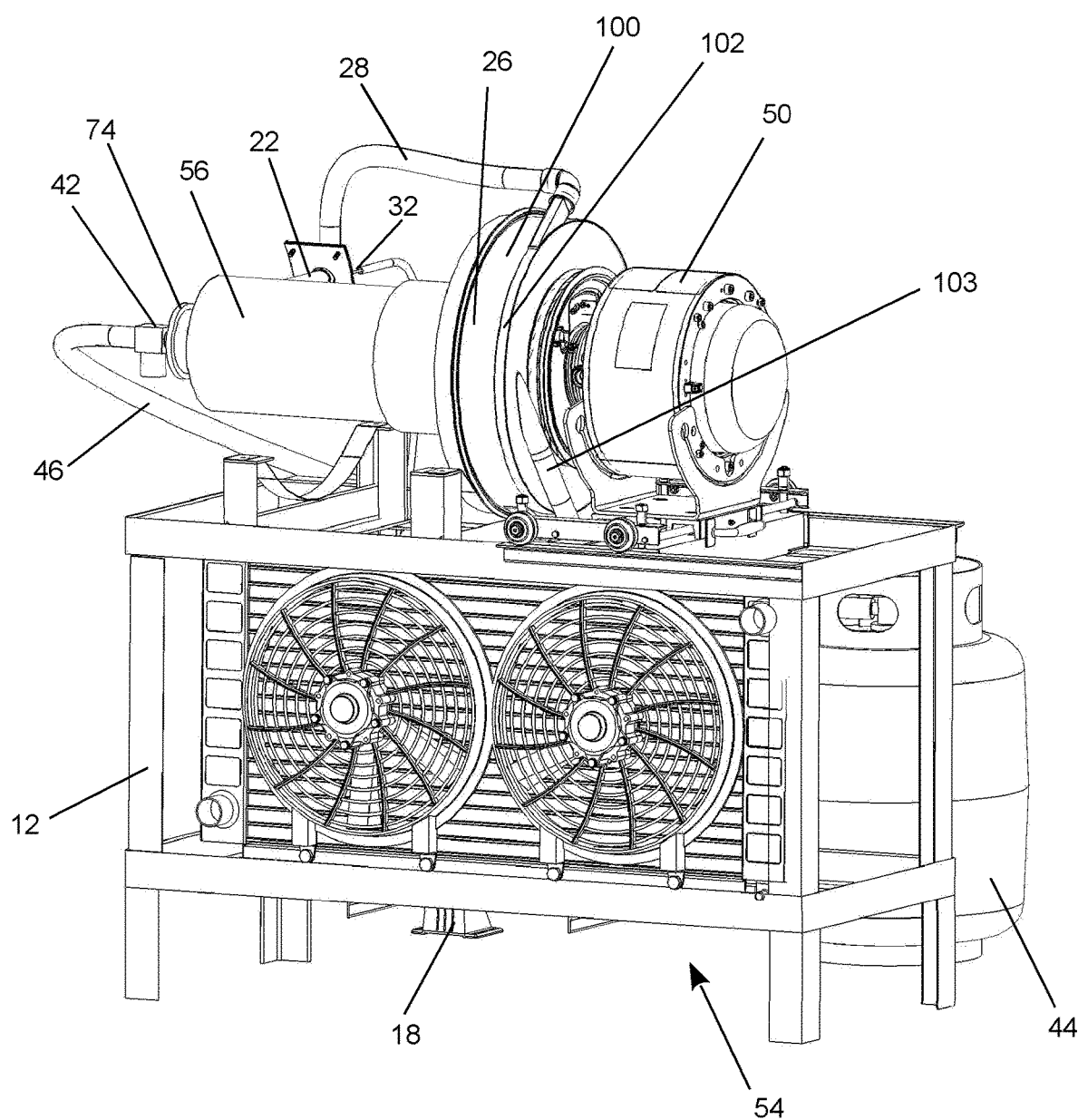
FIG. 14 is a view in perspective viewed from one sides of the preferred embodiment of the invention with some parts removed to reveal interior parts.
Figure 15:
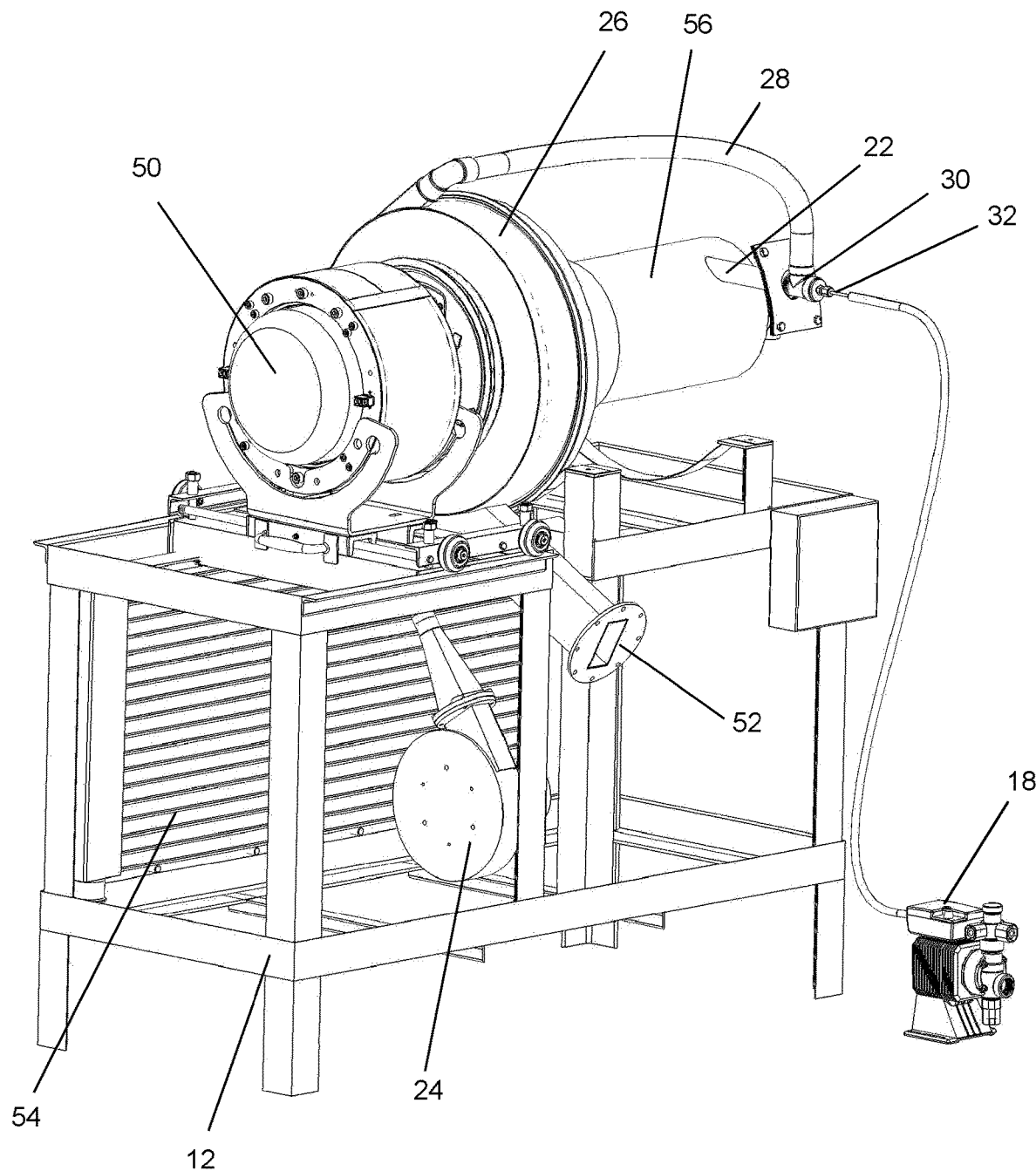
FIG. 15 is a view in perspective viewed from the side opposite the view of FIG. 14 showing the preferred embodiment of the invention with some parts removed to reveal interior parts.

FIGS. 12 and 13 best illustrate the structural detail of the air and fuel intake into the combustion chamber 81. Those figures are lateral sectional views perpendicular to the longitudinal axis of the burner 10. Additionally, in FIGS. 12 and 13 a part of the riser liner 58, the outer insulation layer 60 and the barrel 62 have been removed to reveal the air-fuel injector pipe 22. In FIG. 12 the section is cut axially through the center of the air-fuel injector pipe 22 to reveal its interior.

The air-fuel injector pipe 22 extends along a hole bored through the outer barrel 62 and the insulation layers 56, 58 and 60. The air-fuel injector pipe 22 is aligned parallel to a tangent of the circular cross section of the inner core 56 that defines the combustion chamber 81. The air-fuel injector pipe 22 is spaced radially outward from the center of the combustion chamber 81 and preferably is positioned so that an imaginary extension of the air-fuel injector pipe into the combustion chamber is substantially adjacent the inner surface of the inner core 56. This orientation and positioning of the air-fuel injector pipe 22 causes the fuel and air mixture, which will flow out of the air-fuel injector pipe 22 into the combustion chamber 81, to enter tangentially into the combustion chamber to form a swirling vortex flow. The preferred air-fuel injector pipe 22 has an ID of 22 mm in diameter. The inner end 76 of the air-fuel injector pipe 22 is cut and shaped so that it is substantially flush with the internal cylindrical surface of the inner core 56. The air-fuel injector pipe 22 can terminate within the inner core 56 so that it is recessed slightly from the internal surface of the inner core 56 but still substantially flush with it. Substantially flush and recessed slightly mean that any difference between exactly flush or no recess and the amount of recess or the departure from exactly flush makes no more than an inconsequential and insubstantial difference in the operation of the burner The oil fuel is delivered into the air-fuel injector pipe 22 through the oil supply pipe 32 as previously described. The oil supply pipe 32 is best viewed in FIG. 12. The Tee pipe fitting 30 is illustrated in section in FIG. 12. The oil supply pipe 32 extends longitudinally along essentially the entire length of the air-fuel injector pipe 22 to a downturned end 78. The oil supply pipe 32 has no nozzle at its end and has no built-in nozzle features such as slots or other contours for causing a conical divergence of the oil on exit or a swirl or rotation of the exiting stream of oil that nozzles commonly have for breaking the oil into small particles. Although such nozzles could be used, they have been found experimentally to be unnecessary. The preferred oil supply pipe 32 has and ID of 0.085 inches.

The air-fuel injector pipe 22 also has an insert 80 for forming a venturi at the inner end 76 of the air-fuel injector pipe 22. The venturi insert 80 has a cylindrical periphery for being securely positioned at the inner end 76 of the air-fuel injector pipe 22 but upstream (outward) from the open end of the oil supply pipe 32. The venturi insert 80 has a central orifice 82 that preferably has a diameter within the range of 9 mm to 14 mm and most preferably is 10 mm in diameter. The downturned end 78 of the oil supply pipe 32 is preferably aligned along a radius of the air-fuel injector pipe 22 and preferably terminates at the longitudinal axis of the air-fuel injector pipe 22. The purpose of this arrangement is to align the end 78 of the oil supply pipe 32 transverse to the central axis of the orifice 82 of the venturi insert 80 so that the oil fuel exits the oil supply pipe 32 in a direction that is transverse to, and preferably perpendicular to, the central axis of the orifice 82 at a location axially downstream from the central orifice 82.

During steady-state operation of the burner, the pump 18 is pumping oil fuel through the oil supply pipe 32 into the combustion chamber within the inner core 56 while simultaneously heated combustion air is being blown into the burner through the air-fuel injector pipe 22. The pump 18 meters the flow rate of the oil fuel. During experimental operation the pressure gauge on the oil pump 18, which is capable of a pump pressure of at least 50 psi, does not show a pressure reading. So it is clear that the pressure of the incoming fuel supply is 1 psi or less. The high velocity incoming combustion air is forced through the orifice 82 just prior to the introduction of fuel into the burner at the end 78 of the oil supply pipe 32. The venturi insert 80 causes a region of greatly reduced pressure at the open end of the oil supply pipe 32. As a result, the incoming oil fuel is atomized by the cumulative effect of the lowered pressure downstream from the orifice 82 and the effect of the high velocity air passing across the open end of the oil supply pipe 32. It is the combination of the fuel outlet with no nozzle, its location adjacent to the inner wall of the inner core 56, the tangential air flow through the air-fuel injector pipe 22 and the orifice 82 positioned immediately upstream of the fuel outlet, that efficiently atomizes the oil fuel. This combination is particularly effective for start-up of the burner. Additionally, the air expansion at the fuel outlet end 78 also reduces the temperature of the end 78 of the oil supply pipe 32 which helps prevent the buildup of soot at the end 78.

The oil outlet opening at the end 78 of the oil inlet tube 32 and the venturi insert 80 are positioned at the inner end of the air-fuel injector pipe 22. During steady state operation, that positioning results in combustion being initiated immediately as the fuel-air mixture enters the combustion chamber. That positioning prevents combustion from occurring within the air-fuel injector pipe 22. Because the end of the air-fuel injector pipe 22 is flush or nearly flush with the inner surface of the inner core 56, the mixture of atomized fuel and combustion air enter the combustion chamber immediately upon atomization. Furthermore, because the air-fuel injector pipe 22 is positioned tangentially as described above, the mixture immediately contacts the hot inner surface of the inner core 56 and is immediately moving in a helical vortex flow as described above. It is believed likely, however, that the fuel outlet opening and the orifice would still operate effectively if the orifice were located within 2 cm of the end of the air-fuel injector pipe 22.

The air-fuel injector pipe 22 is also positioned above the center of the cylindrical combustion chamber 81 so that the pipe's tapered end is angled at an incline that positions the protruding tapered end of the air-fuel injector pipe 22 on the upper side of the air-fuel injector pipe 22. That assures that oil that is emitted from the inner end 78 of the oil supply pipe 32 cannot fall onto an interior wall of the air-fuel injector pipe 22 but instead flows directly into a vortex flow.

The ratio of the internal diameters of the air-fuel injector pipe 22 and the venturi orifice 82 determines the pressure reduction caused by the venturi. Consequently, the dimensions stated for those diameters can be scaled up or down for larger or smaller fuel supply rates. The air and fuel flow rates for the burner of the invention are maintained near or at the usual near stoichiometric ratio, which is approximately 16:1. However, it is desirable to operate slightly lean in order to avoid soot deposits and to maintain low carbon monoxide and carbon dioxide emissions. Experimentally, the fuel flow rate was about 0.95 liters/hour. Of course the fuel flow rate can be scaled to higher or lower fuel and air flow rates. Experimentally, the incoming combustion air was preheated in the recuperator 26 to about 145° C. I also found that under the most common temperature conditions the oil fuel does not need to be preheated and works well temperatures on the order of 15 to 20° C. Of course at arctic temperatures some preheating might be desirable. Heat for doing so is readily available from the combusted gases that are exhausted from the recuperator 26 as well as from heat rejected from the Stirling engine.

Recuperator

The recuperator 26 and parts associated with it are best illustrated in FIGS. 14 through 18. Those figures have several components of the preferred embodiment of the invention that have been removed to reveal the components to be described. Although the recuperator is not necessary for operation of the burner, it is highly preferred because it improves the combustion efficiency of the burner.

Figure 16:
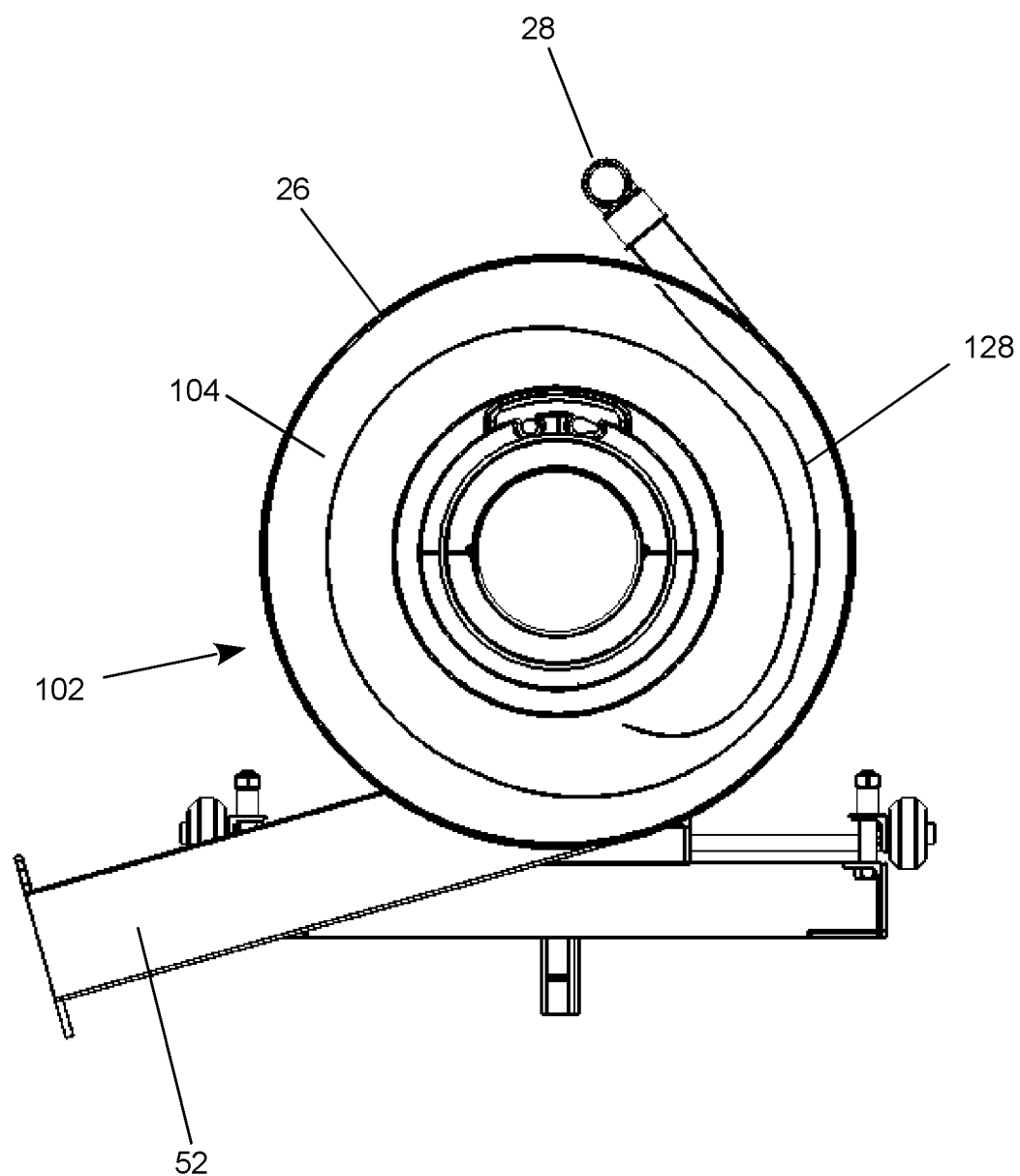
FIG. 16 is a view in lateral section taken perpendicular to the central axis of the combustion chamber and in a plane through the second, combustion-air-heating, annular chamber of the recuperator along the line 16-16 of FIG. 5.

Described generally, the recuperator is a counter-flow heat exchanger, with a flat plate common wall that transfers heat from hot exhaust combustion gases to incoming air for supporting combustion. It is located adjacent the end of the combustion chamber 81 that is opposite from the end where the fuel and combustion air mixture enters at high velocity through the air-fuel injector pipe 22. The recuperator 26 has two side by side annular chambers 100 and 102 that surround the internal head 84 of the Stirling engine 50 and are separated from each other by the impervious common heat conducting wall 104 (FIG. 16). The first recuperator chamber 100 (FIGS. 17, 18) forms an annular passageway through which hot combustion gases flow and then flow out the exhaust pipe 52. The second recuperator chamber 102 is an annular passageway 102 that is axially adjacent the first chamber 100 and is interposed in the combustion air supply between the blower 24 and the air conduit 28.

The bullet shaped heat-distributing head 48 that surrounds the internal head 84 of the Stirling engine 50 extends most of the way into the inner core 56 that defines the combustion chamber 81. As visible in FIG. 17, a gap 98 (containing the flow-indicating arrows) is formed between the peripheral rim 97 of the heat-distributing head 48, the inner surface of the inner core 56 and the inner end surface 99 of the recuperator 22 that borders the combustion chamber 81. Superheated combusted gases exit the combustion chamber 81 through the gap 98 along the path shown by the flow-indicating arrows in FIG. 17 and enter the closer annular chamber 100 of the recuperator 26. The combusted gases circulate around the closer annular chamber 100 in contact with the common wall 104 and are then exhausted to atmosphere through the exhaust pipe 52.

Air from the blower 24 enters the second annular chamber 102 through an air inlet conduit 103, circulates around the annular chamber 102 and flows out through the air conduit 28 to the air-fuel injector pipe 22. As illustrated in FIG. 16, a spiral guide fin 128 is preferably mounted within the second passageway 102 for guiding the incoming combustion air along a spiral path within the passageway 102 in order to further increase heat transfer efficiency.

In that way the recuperator 26 transfers heat from the outgoing gas products of combustion flowing from the burner to the incoming combustion air from the blower 24 as the combustion air flows to the air-fuel injector pipe 22. Preheating the combustion air by means of the recuperator 26 substantially improves the efficiency of the generation of heat from combustion in the combustion chamber 81.

Gas Flame Ignitor

The gas flame ignitor was partially previously described in association with the overview of the invention. The ignitor was developed because it was discovered that an electronic spark, the common ignition system used for oil burners, was not effective for igniting heavy oil. Therefore, in the preferred embodiment of the invention the oil fuel is ignited with a gas flame.

Figure 19:
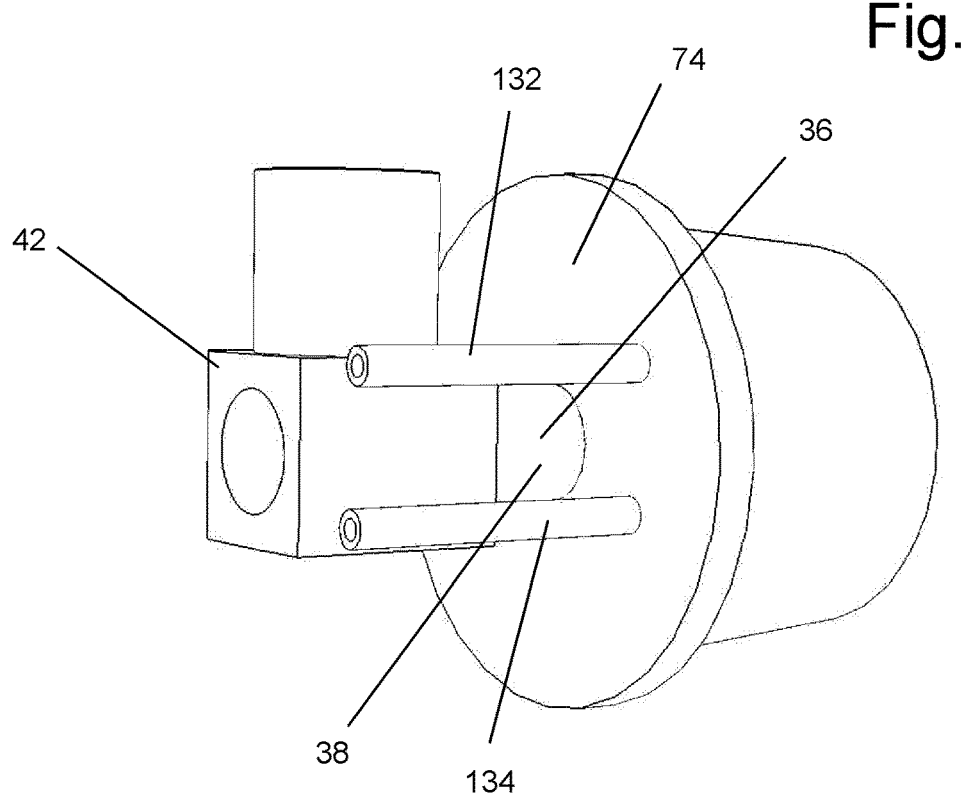
FIG. 19 is a view in perspective of the inspection plug of the preferred embodiment with the outer end of the inspection plug being visible.
Figure 20:
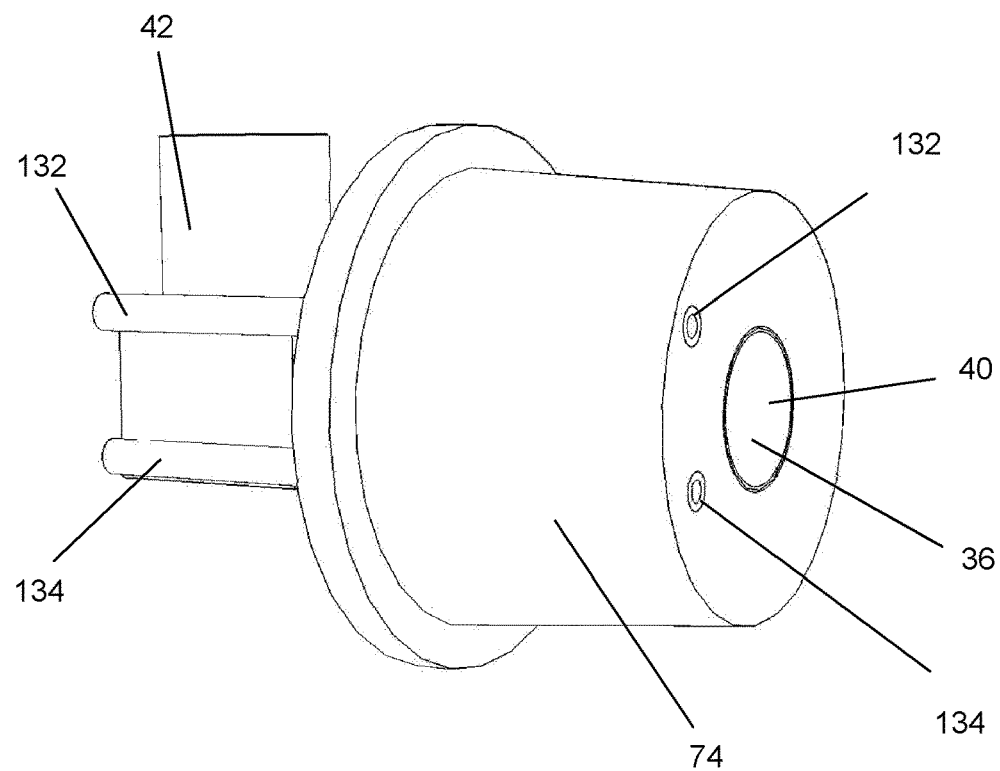
FIG. 20 is a view in perspective of the inspection plug of the preferred embodiment with the inner end of the inspection plug being visible.

FIGS. 19 and 20 illustrate in more detail the inspection plug 74 together with components of the ignitor torch 36 that are molded into the inspection plug 74. The inspection plug 74 is molded from a ceramic that has the same characteristics as the burner core 34 and preferably from the same material. The torch pipe 38 along with its flame holder 40 is molded centrally within and passes through the inspection plug 74. Preferably the flame holder 40 is molded within the inspection plug 74 and its inner end terminates (is flush with) the inner surface of the inspection plug 74. The torch pipe 38 extends axially outward from the inspection plug 74 into connection to the electronic ignition and solenoid valve 42 for connection to the ignitor fuel hose 46 and the ignitor fuel tank 44 (not illustrated in FIGS. 19 and 20). Two ceramic tubes 132 and 134 are also molded into the inspection plug 74 and contain the optical sensors 130 which monitor whether there is combustion within the combustion chamber. Because optical sensors are commercially available, the optical sensors 130 and their associated circuit board are not illustrated. However, desirably the optical sensors themselves are inserted into and mounted within the outer end of each of the ceramic tubes 132 and 134 so they have a direct line-of-sight view of the interior of the combustion chamber 81. Their associated circuit boards are mounted to the ends of the ceramic tubes 132 and 134 and preferably provided with thermal insulation. The ceramic tubes 132 and 134 extend outward from the inspection plug 74 and into the air by a distance that is sufficient to maintain the optical sensors 130 and their associated circuit board at a temperature that will not damage them during operation of the burner.

In order to start the gas flame, a conventional electronic ignition system is provided and is very effective. In order to prepare the burner for oil combustion, blower operation is initiated and the valve on top of the propane tank 44 is opened. Then the valve part of the electronic ignition and solenoid valve 42 is opened to initiate gas flow through the torch pipe 38 and out the flame holder 40 of the ignitor torch 36. Then the electronic igniter is actuated to provide a spark that ignites the propane gas. Once the optical sensors 130 confirm the existence of the gas flame the oil pump 18 is actuated to begin a sprayed injection and atomization of the oil fuel from the air-fuel injector pipe 22. It desirable to initially inject the oil at a fuel flow rate that is greater than is used for steady state operation and then reduce the fuel flow rate for steady state operation after the burner core 34 heats up to achieve better combustion. It has been experimentally found that the oil fuel begins burning within 30 seconds or less after the time of its initial injection and the interior surface of the inner core 56 can be heated to approximately 800° C. Steady state operation is generally between 800-1100° C., depending on operation requirements.

The pair of optical sensors 130 view the combustion chamber 81 through the ceramic tubes 132 and 134 and sense whether the propane ignitor torch 36 is lit. After the propane ignitor torch 36 is ignited and sufficient time has elapsed for the oil fuel to be ignited, such as 30 seconds, the ignitor torch 36 is turned off. After the propane ignitor torch 36 is turned off, the optical sensors 130 sense whether the burner is ignited so that it is burning the oil. If the optical sensors 130 sense that a flame still exists then the starting sequence ends. If the sensors 130 sense that the flame has stopped, the system is shut down and the starting sequence can be repeated.

The only devices to be operated are the oil pump 18, the blower 24 and the electronic ignition and solenoid valve 42. Consequently, a programmed electronic control system can be used which controls all of them. The only necessary input to the programmed electronic control system is a signal from the optical sensors 130. The control system can automatically restart the starting sequence if the optical sensors 130 sense that the oil combustion did not start. Of course additional sensors can be used as inputs to the control system, such as for example, a fuel level sensor for detecting that the oil fuel tank 14 has been drained to a low level. Temperature sensors for detecting burner temperature can be connected as inputs to the control system for modulating the oil flow rate or shutting down in the event of an excessive temperature.

A burner that embodies the invention as described is expected to often operate continuously for weeks at a time and in some applications for a year. Alternatively, for example if the Stirling engines provides electrical power that is not continuously needed, the burner can be periodically operated, including under the automatic control of an electronic controller or, of course, under manual control. I have calculated that, in view of the relatively short duration of the operation of the gas ignitor, the burner can be expected to operate for a year or more as long as it has a supply of oil, even if frequently cycled on and off.

LIST OF PARTS REFERENCE NUMBERS

Burner 10
Support stand 12
Fuel tank 14
Tank hose 16
Oil pump 18
Pump hose 20
Air-fuel injector pipe 22
Blower 24
Recuperator 26
Air conduit (from recuperator) 28
Tee pipe fitting 30
Oil inlet pipe 32
Burner core 34
Ignitor torch 36
Torch pipe 38
Flame holder 40 (for ignitor torch)
Electronic ignition and solenoid valve 42
Ignitor fuel tank 44
Ignitor fuel hose 46
Heat-distributing head 48 (of Stirling engine)
Stirling engine 50
Exhaust pipe 52 (for combustion gases)
Radiator 54
Inner core 56 of burner
Riser liner 58
Outer insulation layer 60
Barrel 62
Endcap assembly 64
Endplate 66
Insulating foamboard disk 67
Central hole 68 of endplate
Circular slot 70 of endplate
Combustion chamber end wall member 72
Inspection plug 74
Inner end 76 of the air-fuel injector pipe
Downturned end 78 of the oil supply pipe
Insert 80 to form venturi
Combustion chamber 81
Orifice 82 of venturi insert
Internal head 84 of Stirling engine
Rim 97 of heat-distributing head (of Stirling engine)
Gap 98
Inner end surface 99 of recuperator
Side by side, coaxial annular chambers 100 and 102 of the recuperator
Combustion supporting air inlet conduit 103
Impervious common wall 104 of the coaxial chambers of recuperator
Spiral guide fin 128 in recuperator
Optical sensors 130
Ceramic tubes 132 and 134 for the optical sensors

The invention claimed is:

1. A burner capable of burning crude or other heavy oil fuel from a fuel supply, the burner including a combustion chamber having a cylindrical interior surface surrounded by a wall that includes thermal insulation, the burner comprising:

(a) an air-fuel injector pipe extending from an outer open end through the wall and opening into the combustion chamber at an inner open end, the air-fuel injector pipe being positioned so that, in the operable orientation of the combustion chamber, the inner end of the air-fuel injector pipe is at a top of the combustion chamber, the air-fuel injector pipe being aligned parallel to and adjacent to a tangent of the cylindrical interior surface of the combustion chamber wall and configured to inject fuel and air into the combustion chamber along the cylindrical interior surface and generate a vortex flow along the combustion chamber;

(b) an oil supply pipe having an outer end for connection to the fuel supply and extending into and along the interior of the air-fuel injector pipe to an inner open end of the oil supply pipe positioned proximate the inner end of the air-fuel injector pipe, the oil supply pipe having a downturned bend between a venturi insert and the inner open end of the oil supply pipe;

(c) the venturi insert fixed within the air-fuel injector pipe and having an orifice positioned outward of the inner open end of the oil supply pipe, the venturi insert being within 2 cm of the inner end of the air-fuel injector pipe; and (d) a combustion air supply including a blower and a recuperator having side by side chambers separated by an impervious common heat conducting wall, the blower being connected to a combustion air inlet of a first of said recuperator chambers, the outer open end of the air-fuel injector pipe being connected to a combustion air outlet of the first recuperator chamber, a second of said recuperator chambers having an exhaust gas inlet connected to the combustion chamber and an exhaust gas outlet, the combustion air supply being configured to flow outgoing combusted gases through the second recuperator chamber and transfer heat through the common heat conducting wall to incoming combustion air flowing through the first recuperator chamber and the air fuel injector pipe.

2. A burner according to claim 1 wherein the oil supply pipe has no nozzle at its inner open end and has no built in nozzle features for causing divergence of an exiting stream of fuel.

3. A burner according to claim 1 wherein the air-fuel injector pipe is proximate a first end wall of the combustion chamber and wherein a gas ignitor torch extends through the combustion chamber wall proximate the first end wall and is configured to initially ignite fuel flowing from the oil supply pipe.

4. A burner according to claim 3 wherein an inspection opening is formed through the first end wall of the combustion chamber and a removable inspection plug is inserted in the inspection opening and wherein the gas ignitor torch extends though the inspection plug.

5. A burner according to claim 4 wherein the gas ignitor torch has a ceramic flame holder within the inspection plug at the inner end of the gas ignitor torch, the flame holder having an inner end that is flush with an inner surface of the inspection plug.

6. A burner according to claim 5 wherein at least one ceramic tube also extends through the inspection plug, the ceramic tube having an optical sensor with a direct line of sight view of the interior of the combustion chamber and configured for monitoring whether there is combustion within the combustion chamber.

7. A burner according to claim 1 wherein the burner is a vortex burner for applying heat to a heat absorbing load, the vortex burner comprising:
(a) a cylindrical combustion chamber having opposite ends and surrounded by ceramic thermal insulation forming a cylindrical interior wall;
(b) a fuel inlet pipe and an air inlet pipe configured for injecting fuel and combustion-supporting air into a first of the opposite ends of the combustion chamber in a helical flow direction along the cylindrical interior wall of the combustion chamber to a second of the opposite ends;
(c) a gas ignitor torch extending into the combustion chamber at the first of the opposite ends of the combustion chamber and configured to ignite injected fuel;
(d) a recuperator at the second of the opposite ends of the combustion chamber, the recuperator having side by side chambers separated by an impervious common heat conducting wall, the air inlet pipe being connected to a combustion air outlet of a first of the chambers, a second of the chambers having an exhaust gas inlet connected to the combustion chamber and an exhaust gas outlet, the recuperator being configured to receive a flow of outgoing combusted gases through the second chamber and transfer heat through the common heat conducting wall to incoming combustion air flowing through the first chamber and the air inlet pipe; and
(e) a blower having an input and having an output connected to the combustion air inlet of the first of said chambers.

8. A burner according to claim 7 wherein the heat absorbing load is positioned proximate the second of the opposite ends of the combustion chamber and inward of the recuperator with a gap for the flow of hot combusted gases around the heat absorbing load and into the exhaust gas inlet of the second of the recuperator chambers.

9. A burner according to claim 8 wherein the heat absorbing load comprises a Stirling engine extending into the combustion chamber.

10. A burner according to claim 9 wherein the Stirling engine has an internal head positioned proximate the second of the opposite ends of the combustion chamber and the heat absorbing load further comprises a heat distributing head surrounding the internal head of the Stirling engine and extending into the combustion chamber, the heat distributing head being positioned in the combustion chamber for being swept by combusted gases flowing to the recuperator and for receiving thermal radiation from inner walls of the combustion chamber.

11. A burner according to claim 10 wherein the impervious common heat conducting wall of the recuperator is a stainless steel wall.

12. A burner according to claim 1, the burner having a tubular combustion chamber surrounded by and comprising:
(a) a riser liner;
(b) an inner core forming an inner wall of the combustion chamber concentric with the riser liner, the inner core being cast onto an inner surface of the riser liner from a particulate ceramic powder and having a thermal conductivity of less than 10 BTU in/(h·ft$^2$·° F.);
(c) an outer ceramic insulation layer comprising alumina silica blanket insulation wrapped concentrically around the riser liner; and
(d) a steel barrel surrounding the alumina silica blanket insulation.

13. A burner according to claim 12 wherein the blanket insulation extends continuously from the riser liner to the steel barrel.

14. A burner according to claim 12 wherein a ceramic combustion chamber endwall is seated against an end of the concentric riser liner, inner core and outer ceramic insulation, the endwall having a circular slot, the circular slot having an inner diameter equal to the inner diameter of the inner core and having an outer diameter equal to the outer diameter of the riser liner for matingly receiving the inner core and riser liner into the circular slot.

15. A burner according to claim 12 and further comprising an opening through the endwall and a manually removable inspection plug mounted in the opening.

16. A burner according to claim 12 thermal conductivity of the inner core is less than 4 BTU in/(h·ft$^2$·° F.).

17. A burner according to claim 12 wherein the barrel is a stainless steel barrel.

18. A burner according to claim 12 wherein the burner includes a second riser, the risers being concentrically positioned around a common central axis and abut end to end.

* * * * *